US012266789B2

(12) United States Patent
Kim et al.

(10) Patent No.: US 12,266,789 B2
(45) Date of Patent: Apr. 1, 2025

(54) POSITIVE ELECTRODE ACTIVE MATERIAL FOR LITHIUM-SULFUR BATTERY, PREPARATION METHOD THEREOF AND LITHIUM-SULFUR BATTERY COMPRISING SAME

(71) Applicants: LG ENERGY SOLUTION, LTD., Seoul (KR); SEOUL NATIONAL UNIVERSITY R&DB FOUNDATION, Seoul (KR)

(72) Inventors: Soohyun Kim, Daejeon (KR); Jong-Chan Lee, Seoul (KR); Kihyun Kim, Daejeon (KR); Kwonnam Sohn, Daejeon (KR); Daun Jeong, Seoul (KR); Chan Yeong Koong, Seoul (KR)

(73) Assignees: LG Energy Solution, Ltd., Seoul (KR); Seoul National University R&DB Foundation, Seoul (KR)

( * ) Notice: Subject to any disclaimer, the term of this patent is extended or adjusted under 35 U.S.C. 154(b) by 509 days.

(21) Appl. No.: 17/776,508

(22) PCT Filed: Aug. 4, 2021

(86) PCT No.: PCT/KR2021/010204
§ 371 (c)(1),
(2) Date: May 12, 2022

(87) PCT Pub. No.: WO2022/035120
PCT Pub. Date: Feb. 17, 2022

(65) Prior Publication Data
US 2022/0393157 A1   Dec. 8, 2022

(30) Foreign Application Priority Data
Aug. 11, 2020   (KR) ........................ 10-2020-0100684

(51) Int. Cl.
*H01M 4/36*      (2006.01)
*H01M 4/04*      (2006.01)
(Continued)

(52) U.S. Cl.
CPC ......... *H01M 4/366* (2013.01); *H01M 4/0471* (2013.01); *H01M 4/5815* (2013.01);
(Continued)

(58) Field of Classification Search
None
See application file for complete search history.

(56) References Cited

U.S. PATENT DOCUMENTS

2014/0093767 A1    4/2014   Sakitani et al.
2015/0188144 A1    7/2015   Shin et al.
(Continued)

FOREIGN PATENT DOCUMENTS

CN    103474633 A    12/2013
CN    110692158 A    1/2020
(Continued)

OTHER PUBLICATIONS

Barchasz, et al.(2012). "Novel Positive Electrode Architecture for Rechargeable Lithium/Sulfur Batteries" Journal of Power Sources. vol. 211. pp. 19-26.

*Primary Examiner* — Carlos Barcena
(74) *Attorney, Agent, or Firm* — Bryan Cave Leighton Paisner LLP

(57) ABSTRACT

The present disclosure relates to a positive electrode active material, a preparation method thereof, and a lithium-sulfur battery including the same, more particularly to a positive electrode active material including a particulate structure of a core-shell structure which comprises a core part and a shell part covering the whole surface or a part of the surface of the core part, wherein the core part comprises a sulfur com-
(Continued)

pound, and the shell part comprises a polythiophene acetic acid-polyethylene glycol graft copolymer. The positive electrode active material of the present disclosure has excellent electrochemical reactivity and adsorbs lithium polysulfide to improve capacity and lifetime characteristics of the lithium-sulfur battery.

18 Claims, 4 Drawing Sheets

(51) Int. Cl.
  *H01M 4/58* (2010.01)
  *H01M 4/62* (2006.01)
  *H01M 10/0525* (2010.01)
  *H01M 4/02* (2006.01)

(52) U.S. Cl.
  CPC ............. *H01M 4/62* (2013.01); *H01M 4/625* (2013.01); *H01M 10/0525* (2013.01); *H01M 2004/028* (2013.01)

(56) References Cited

U.S. PATENT DOCUMENTS

| | | |
|---|---|---|
| 2016/0164103 A1 | 6/2016 | Son et al. |
| 2017/0358800 A1 | 12/2017 | Sun et al. |
| 2018/0294475 A1 | 10/2018 | Zhamu et al. |
| 2020/0350586 A1 | 11/2020 | Chae et al. |
| 2021/0119216 A1 | 4/2021 | Kim |

FOREIGN PATENT DOCUMENTS

| | | |
|---|---|---|
| CN | 111033835 A | 4/2020 |
| JP | 04253170 A | 9/1992 |
| JP | 04264363 A | 9/1992 |
| JP | 04267074 A | 9/1992 |
| JP | 2606632 B2 | 5/1997 |
| JP | 2015043300 A | 3/2015 |
| JP | 6081357 B2 | 2/2017 |
| KR | 10-0666133 B1 | 1/2007 |
| KR | 10-2015-0078432 A | 7/2015 |
| KR | 10-2016-0037084 A | 4/2016 |
| KR | 10-2016-0046775 A | 4/2016 |
| KR | 10-2017-0085195 A | 7/2017 |
| KR | 10-2017-0090098 A | 8/2017 |
| KR | 10-2017-0139761 A | 12/2017 |
| KR | 10-2018-0052578 A | 5/2018 |
| KR | 10-2018-0058605 A | 6/2018 |
| KR | 10-2019-0037019 A | 4/2019 |
| KR | 10-2020-0049685 A | 5/2020 |
| WO | 2019066219 A1 | 4/2019 |

【Figure 1】
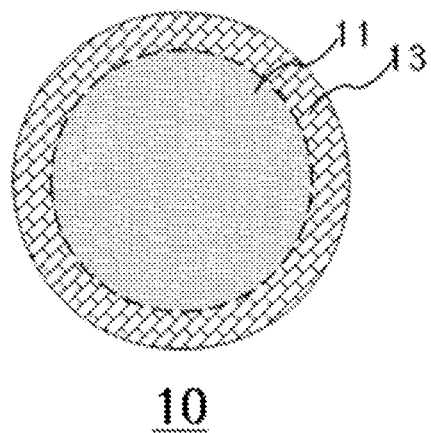
10
【Figure 2】
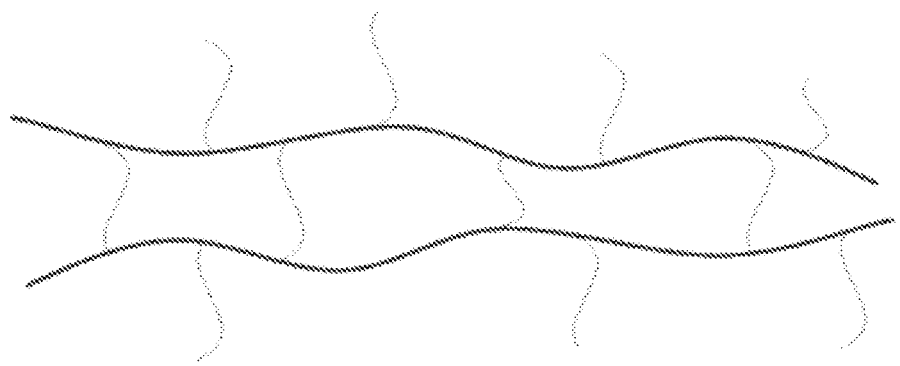

【Figure 3】
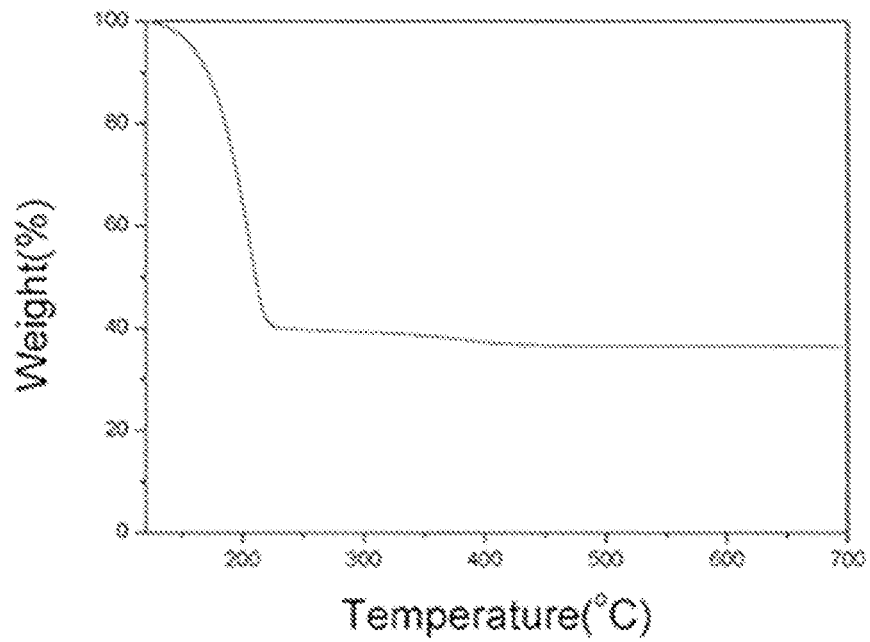
【Figure 4】
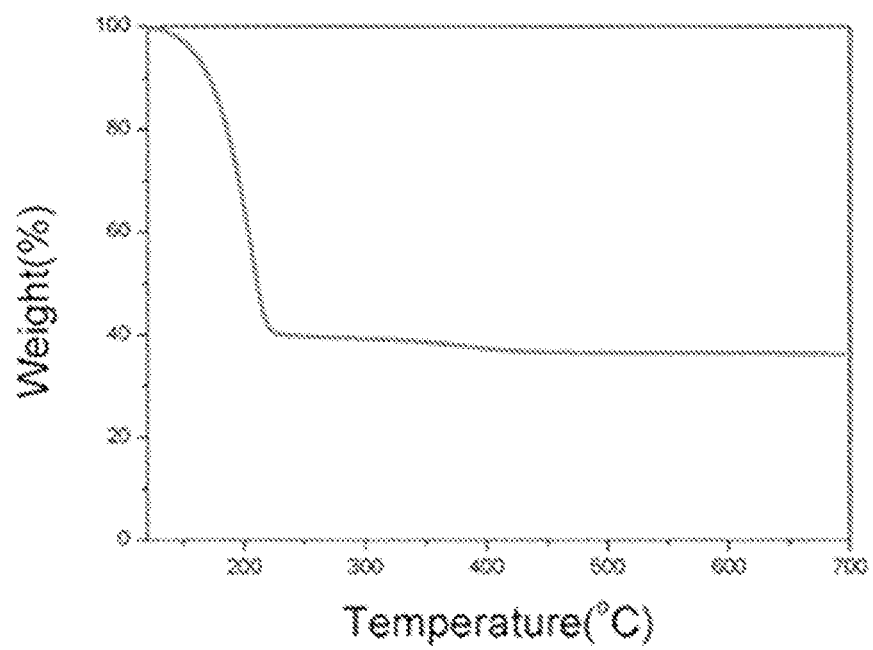

[Figure 5]
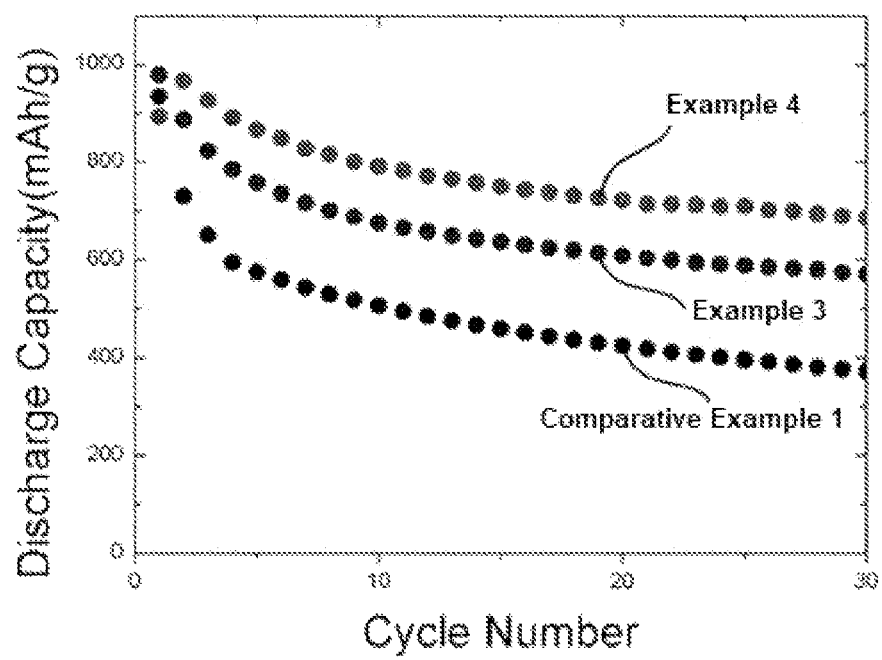

【Figure 6】
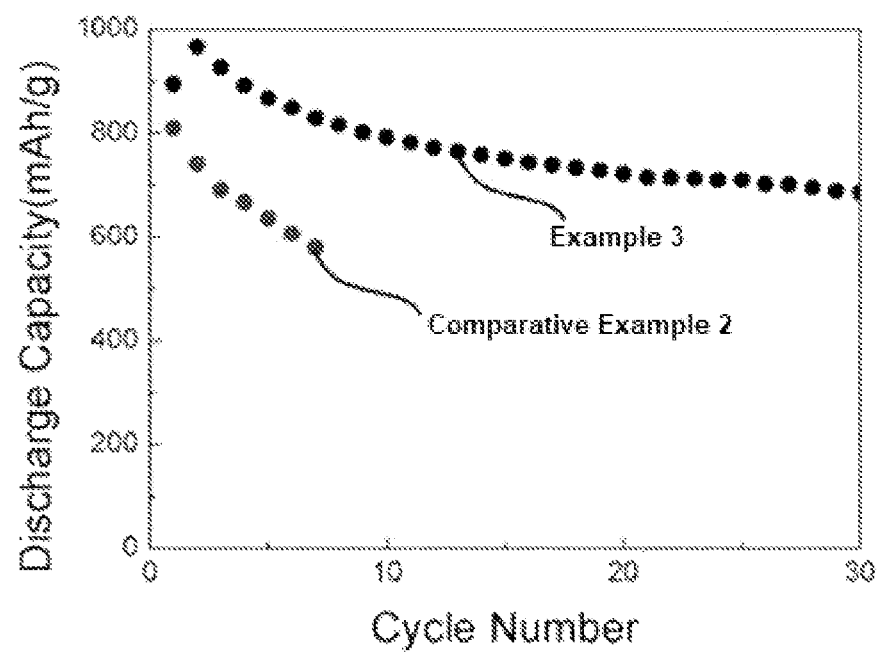

POSITIVE ELECTRODE ACTIVE MATERIAL FOR LITHIUM-SULFUR BATTERY, PREPARATION METHOD THEREOF AND LITHIUM-SULFUR BATTERY COMPRISING SAME

The present application is a National Phase entry pursuant to 35 U.S.C. § 371 of International Application No. PCT/KR2021/010204 filed on Aug. 4, 2021, and claims priority to and the benefit of Korean Patent Application No. 10-2020-0100684, filed on Aug. 11, 2020, the entire disclosures of which are incorporated herein by reference in their entirety.

FIELD

The present invention relates to a positive electrode active material for a lithium-sulfur battery, a preparation method thereof, and a lithium-sulfur battery comprising the same.

BACKGROUND

As the utilization range of lithium secondary batteries is expanded not only to portable electronic devices and communication devices, but also to electric vehicles (EV) and electric storage systems (ESS), the demand for high capacity of lithium secondary batteries used as their power sources is increasing.

The lithium-sulfur battery among various lithium secondary batteries is a battery system using a sulfur-based material having a sulfur-sulfur bond (S—S bond) as a positive electrode active material and using lithium metal, a carbon-based material in which intercalation/deintercalation of lithium ions occurs, or silicon or tin that forms an alloy with lithium as a negative electrode active material.

There is an advantage that sulfur, which is the main material of the positive electrode active material in the lithium-sulfur battery, has a low atomic weight, is very rich in resources and thus easy to supply and receive, and is cheap, non-toxic and environmentally friendly.

In addition, the lithium-sulfur battery has a theoretical capacity of 1,675 mAh/g derived from a conversion reaction of lithium ion and sulfur ($S_8+16Li^++16e^-\rightarrow 8Li_2S$) in the positive electrode, and when using lithium metal (theoretical capacity: 3,860 mAh/g) as a negative electrode, has a theoretical energy density of 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg) and the lithium secondary battery (250 Wh/kg), the lithium-sulfur battery is attracting attention as a high-capacity, eco-friendly and low-cost lithium secondary battery among secondary batteries that have been developed to date, and is a next-generation battery system to which several studies are being conducted.

In the case of the lithium-sulfur battery, when discharging it, the reduction reaction in which the sulfur accepts the electrons is proceeded at the positive electrode and the oxidation reaction in which lithium is ionized is proceeded at the negative electrode, respectively.

In this lithium-sulfur battery, since sulfur, which is used in a positive electrode active material, has an electrical conductivity of $5\times10^{-30}$ S/cm and thus is a non-conductor without electrical conductivity, there is a problem that it is difficult to move electrons generated by an electrochemical reaction. Thus, sulfur is complexed and used with an electrically conductive material such as carbon that can provide an electrochemical reaction site. However, in this case, since other conductive materials are comprised in the positive electrode active material together, there is a problem that the electrochemical reactivity of the positive electrode is insufficient, and accordingly, the energy density of the entire battery is lowered.

In addition, during the discharging of the lithium-sulfur battery, lithium polysulfides ($Li_2S_x$, x=2 to 8) are generated in the positive electrode, and some of these are readily dissolved in the electrolyte, causing sulfur to elute from the positive electrode, and thus accelerating the decrease in the electrochemical reactivity of the positive electrode, and thus the reversible capacity of the positive electrode is greatly reduced, and also the dissolved lithium polysulfide diffuses to the negative electrode, causing various side reactions. Also, during the charging process, the lithium polysulfide causes a shuttle reaction, thereby significantly reducing the charging/discharging efficiency.

Due to the problems described above, the lithium-sulfur battery has a high initial capacity during actual operation, but as the cycles are progressed, the capacity and charging/discharging efficiency characteristics are rapidly reduced, and thus the lifetime is also shortened. Therefore, it is difficult to secure sufficient performance and operational stability, so it has not been commercialized.

Accordingly, various technologies have been proposed to compensate for the low electrical conductivity of sulfur in the lithium-sulfur battery and to solve the problem of elution of lithium polysulfide.

For example, Korean Laid-open Patent Publication No. 2017-0139761 discloses that by incorporating a positive electrode active material layer comprising a carbon material doped with nitrogen and a protective layer, the elution of lithium polysulfide can be delayed, thereby improving the capacity and lifetime of the battery.

In addition, Korean Laid-open Patent Publication No. 2016-0046775 discloses that it is possible to improve the cycle characteristics of a battery by providing a positive electrode coating layer made of an amphiphilic polymer on the surface of a part of the positive electrode active part containing a sulfur-carbon composite, thereby suppressing the elution of the lithium polysulfide and facilitating the movement of lithium ions.

In addition, Korean Laid-open Patent Publication No. 2016-0037084 discloses that by coating graphene on the carbon nanotube aggregate containing sulfur, the lithium polysulfide is prevented from being dissolved, and the electrical conductivity of the sulfur-carbon nanotube composite and the loading amount of sulfur can be increased.

These patent publications have suppressed the elution of lithium polysulfide and improved the electrical conductivity of sulfur by introducing a material with excellent lithium polysulfide adsorption capacity or conductivity to the positive electrode in the form of an additive or coating layer, and thus have improved the problem of reduction in performance or lifetime of lithium-sulfur battery to some extent, but the effect is not sufficient. In addition, the method proposed in these patents is not only somewhat complicated, but also has a problem that the amount of sulfur that can be added (i.e., the loading amount) is limited. Therefore, it is still necessary to develop a lithium-sulfur battery that exhibits improved electrochemical reactivity and thus has excellent performance while increasing the loading amount of sulfur in the positive electrode.

PATENT DOCUMENT

Korean Patent Publication No. 10-2017-0139761(Dec. 20, 2017), CATHODE FOR METAL-SULFUR BATTERY HAVING CATHODE ACTIVE MATERIAL LAYER CONTAINING N-DOPED CARBON AND PROTECTIVE FILM.

Korean Patent Publication No. 10-2016-0046775 (Apr. 29, 2016), CATHODE FOR LITHIUM-SULFUR BATTERY AND METHOD OF PREPARING THE SAME.

Korean Patent Publication No. 10-2016-0037084 (Apr. 5, 2016), SURFUR-CARBONNANOTUBE COMPLEX, METHOD OF PREPARING THE SAME, CATHODE ACTIVE MATERIAL FOR LITHIUM-SULFUR BATTERY INCLUDING THE SAME AND LITHIUM-SULFUR BATTERY INCLUDING THE SAME.

SUMMARY

Accordingly, as a result of conducting various studies to solve the above problems, the inventors of the present invention have confirmed that when the surface of the positive electrode active material containing the sulfur compound is coated with a specific polymer that exhibits both electron conductivity and ion conductivity, the electrochemical reactivity of the sulfur compound and the positive electrode is improved, and the elution of lithium polysulfide is suppressed, so that the capacity and lifetime characteristics of the lithium-sulfur battery can be improved, and thus have completed the present invention.

Therefore, it is an object of the present invention to provide a positive electrode active material for a lithium-sulfur battery capable of suppressing the elution of lithium polysulfide as well as excellent electrochemical reactivity, and a method for preparing the same.

In addition, it is another object of the present invention to provide a positive electrode for a lithium-sulfur battery comprising the positive electrode active material.

In addition, it is still another object of the present invention to provide a lithium-sulfur battery comprising the positive electrode.

In order to achieve the above objects, the present invention provides a positive electrode active material comprising a particulate structure of a core-shell structure which comprises a core part and a shell part covering the whole surface or a part of the surface of the core part, wherein the core part comprises a sulfur compound, and the shell part comprises a polythiophene acetic acid-polyethylene glycol graft copolymer.

The polythiophene acetic acid-polyethylene glycol graft copolymer may comprise a compound having a structure represented by the following Formula 1:

[Formula 1]

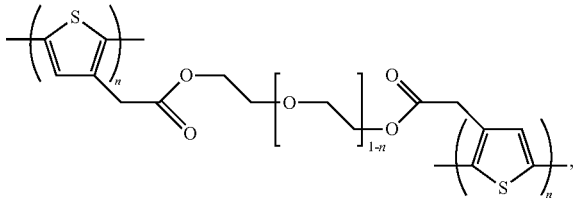

wherein n is as described in the specification.

In addition, the present invention provides a method of preparing a positive electrode active material which comprises the steps of (a) preparing a core part comprising a sulfur compound, and (b) mixing the core part with a solution containing polythiophene acetic acid and polyethylene glycol-based polymer, and then heat-treating it to form a shell part comprising a polythiophene acetic acid-polyethylene glycol graft copolymer on the whole surface or a part of the surface of the core part.

In addition, the present invention provides a positive electrode comprising the positive electrode active material for the lithium-sulfur battery.

In addition, the present invention provides a lithium-sulfur battery comprising the positive electrode.

The positive electrode active material for lithium-sulfur battery according to the present invention enables the realization of a lithium-sulfur battery having high capacity and high energy density by coating the surface with a polymer that not only has electron conductivity and ion conductivity but also can adsorb lithium polysulfide, and thus improving the reactivity of the positive electrode containing the sulfur-carbon composite as well as suppressing the elution of lithium polysulfide, thereby maximizing the capacity expression of the positive electrode.

BRIEF DESCRIPTION OF THE DRAWINGS

FIG. 1 is a cross-sectional view of a positive electrode active material for a lithium-sulfur battery according to an embodiment of the present invention.

FIG. 2 is a view showing the structure of a polythiophene acetic acid-polyethylene glycol graft copolymer according to an embodiment of the present invention.

FIG. 3 is a graph showing the results of thermogravimetric analysis of the positive electrode active material according to Example 1.

FIG. 4 is a graph showing the results of thermogravimetric analysis of the copolymer according to Preparation Example 2.

FIG. 5 is a graph showing the results of performance evaluation of lithium-sulfur batteries according to Examples 3 and 4 and Comparative Example 1 of the present invention.

FIG. 6 is a graph showing the results of performance evaluation of lithium-sulfur batteries according to Example 3 and Comparative Example 2 of the present invention.

DETAILED DESCRIPTION

Hereinafter, the present invention will be described in detail with reference to the accompanying drawings so that those of ordinary skill in the art can easily carry out the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used in the present invention is for the purpose of describing particular embodiments only and is not intended to be limiting of the invention. The singular forms "a," "an," and "the" include plural referents unless the context clearly dictates otherwise. It is to be understood that the terms "comprise" or "have" as used in the present invention, are intended to designate the presence of stated features, numbers, steps, operations, components, parts or combinations thereof, but not to preclude the possibility of the presence or addition of one or more other features, numbers, steps, operations, components, parts, or combinations thereof.

The term "composite" as used herein refers to a material that two or more materials are combined to express a more effective function while forming physically and chemically different phases to each other.

The term "polysulfide" used in the present invention has a concept including both "polysulfide ion ($S_x^{2-}$, x=8, 6, 4, 2)" and "lithium polysulfide ($Li_2S_x$ or $LiS_x^-$, x=8, 6, 4, 2)".

The lithium-sulfur battery has higher theoretical discharging capacity and theoretical energy density than other various secondary batteries, and is attracting attention as a next-generation secondary battery due to the advantage that sulfur, which is used as a positive electrode active material, is rich in resources and is cheap and environmentally friendly.

However, in the case of a lithium-sulfur battery, due to the low electrical conductivity and lithium-ion conductivity of sulfur, which is a positive electrode active material, it is difficult to secure sufficient reactivity for the oxidation/reduction reaction, and thus realize all of the theoretical energy density in actual operation.

In addition, as discharging is proceeded in the lithium-sulfur battery, the sulfur is continuously converted from the cyclic $S_8$ structure to the linear structures of lithium polysulfides ($Li_2S_x$, x=8, 6, 4, 2) by continuously reacting with lithium ions and, when the lithium polysulfides are completely reduced, lithium sulfide ($Li_2S$) is finally produced. Among the lithium polysulfides which are the intermediate products of this sulfur reduction reaction (discharging), lithium polysulfides ($Li_2S_x$, usually x>4), which has the high oxidation number of sulfur, are substances with a strong polarity, and are easily dissolved in the electrolyte comprising a hydrophilic organic solvent and thus released outside the reaction zone of the positive electrode, thereby no longer participating in the electrochemical reaction and thus resulting in the loss of sulfur.

Despite advantages as described above, since the amount of sulfur involved in the electrochemical reaction is sharply reduced due to this elution of the lithium polysulfide, the lithium-sulfur battery does not realize all of theoretical capacity and energy density in actual operation. In addition, the eluted lithium polysulfide reacts with lithium in the negative electrode to form solid lithium sulfide on the surface of the negative electrode. There is a problem that the solid lithium sulfide does not decompose even during charging, so it acts as an irreversible capacity, and interferes with the electrochemical reaction on the surface of the negative electrode, thereby accelerating the deterioration of capacity and lifetime characteristics. In addition, there is a problem that the lithium polysulfide is not completely reduced while shuttling between the positive electrode and the negative electrode and undergoes a cycle reaction that consumes electrons, thereby reducing charging and discharging efficiency.

To this end, in the prior art, a method of adding or coating a material capable of increasing the electrochemical reactivity of sulfur and suppressing the elution of lithium polysulfide to the positive electrode has been proposed, but the effect of improving the electrical conductivity of sulfur and/or lithium ion conductivity and the elution of lithium polysulfide was insignificant.

In particular, in the case of a method of coating a functional material on the conductive material or sulfur-carbon composite contained in the positive electrode active material, it was reported that a sufficient effect was expressed for a positive electrode with a low loading amount of sulfur, but it was difficult to obtain the desired effect for a positive electrode with a high loading amount of sulfur.

Accordingly, a method of increasing the concentration of the functional material used in the coating has been studied, but the high concentration of the coating rather lowered the electrochemical reactivity of sulfur and caused the effect to be inhibited by an increase in the resistance component.

Accordingly, the present invention provides a positive electrode active material for a lithium-sulfur battery capable of securing excellent electrochemical reactivity and inhibition effect on the elution of lithium polysulfide regardless of the sulfur content by coating the sulfur-carbon composite with a material that has both ion conductivity and electron conductivity.

Specifically, as shown in FIG. 1, the positive electrode active material (10) for lithium-sulfur battery according to an embodiment of the present invention comprises a particulate structure of a core-shell structure which comprises a core part (11) and a shell part (13) covering the whole surface or a part of the surface of the core part, wherein the core part (11) comprises a sulfur compound, and the shell part (13) comprises a polythiophene acetic acid-polyethylene glycol graft copolymer.

In the present invention, the sulfur compound contained in the core part (11) may be at least one selected from the group consisting of elemental sulfur ($S_8$) and a sulfur compound. Specifically, the sulfur compound may comprise at least one selected from the group consisting of inorganic sulfur, $Li_2S_n$ (n≥1), a disulfide compound, an organic sulfur compound, and a carbon-sulfur polymer (($C_2S_x)_n$, wherein x is 2.5 to 50 and n≥2). Preferably, the sulfur compound may be inorganic sulfur.

Since the sulfur compound does not have its own electrical conductivity, it is used in combination with a conductive material such as carbon. Accordingly, the sulfur compound contained in the core part is in the form of a sulfur-carbon composite complexed with a porous carbon material.

The porous carbon material not only provides a skeleton to which the above-described sulfur compound can be uniformly and stably fixed, but also compensates for the low electrical conductivity of the sulfur compound to allow the electrochemical reaction to proceed smoothly.

The porous carbon material can be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porous carbon material. If the average diameter of the pores is less than the above range, the impregnation of sulfur is impossible because the pore size is only at the molecular level. On the contrary, if the average diameter of the pores exceeds the above range, the mechanical strength of the porous carbon material is weakened, which is not preferable for application to the manufacturing process of the electrode.

The shape of the porous carbon material is in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Super-P, Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and natural graphite, artificial graphite, expanded graphite, and activated carbon. Preferably, the porous carbon material may be carbon nanotubes.

The sulfur-carbon composite may include a porous carbon material and a sulfur compound applied to at least a portion of the inner and outer surfaces of the porous carbon material. For example, the sulfur-carbon composite may be complexed by simply mixing the above-described sulfur compound and a porous carbon material, or may have a coating form or a supported form of a core-shell structure. The coating form of the core-shell structure is one in which any one of a sulfur compound or a porous carbon material is coated with another material, and for example, may wrap the inner or outer surface of the porous carbon material with a sulfur compound or vice versa. In addition, the supported form may be a form in which a sulfur compound is supported on the inner or outer surface of the porous carbon material. The form of the sulfur-carbon composite can be used in any form as long as it comprises the above-described sulfur compound and porous carbon material, and is not limited in the present invention.

As described above, in the sulfur-carbon composite, the sulfur compound is located on at least one of the inner and outer surfaces of the porous carbon material, and for example, may be present in an area of less than 100%, preferably 1 to 95%, more preferably 40 to 95% of the whole surface of the inside and outside of the porous carbon material. When the sulfur compound is present on the inner and outer surfaces of the porous carbon material within the above range, the maximum effect may be exhibited in terms of electron transport area and wettability with the electrolyte. Specifically, since the sulfur compound is thinly and evenly impregnated on the inner and outer surfaces of the porous carbon material in the above-mentioned range, the electron transport contact area can be increased in the charging/discharging process. If the sulfur compound is located in an area of 100% of the whole surface of the inside and outside of the porous carbon material, since the porous carbon material is completely covered with a sulfur compound, wettability to the electrolyte is deteriorated and contact property is deteriorated, so that it cannot receive the electron transport and thus cannot participate in an electrochemical reaction.

In the sulfur-carbon composite according to the present invention, the weight ratio of the above-described sulfur and the porous carbon material may be 9:1 to 7:3, preferably 9:1 to 7.5:2.5. If the content of sulfur is less than 70% by weight based on 100% by weight of the total of the sulfur-carbon composite, as the content of the porous carbon material is relatively increased, the specific surface area is increased, so that the content of the binder required for manufacturing the positive electrode is increased. An increase in the amount of the binder used may eventually increase the sheet resistance of the positive electrode and act as an insulator to prevent electron pass, thereby degrading the performance of the battery. On the contrary, if the content of sulfur exceeds 90% by weight, as sulfur compounds that are not combined with the porous carbon material aggregate with each other or are re-eluted to the surface of the porous carbon material, it becomes difficult to receive electrons and cannot participate directly in the electrochemical reaction, and thus can result in loss of battery capacity.

The sulfur-carbon composite is three-dimensionally interconnected in the structure, and can support a sulfur compound in a high content due to pores of various sizes. Due to this, even if soluble polysulfide is generated by the electrochemical reaction, when it can be located inside the sulfur-carbon composite, the three-dimensional entangled structure is maintained even when the polysulfide is eluted, and thus it is possible to suppress the phenomenon of collapse of the structure of the positive electrode. As a result, the lithium secondary battery comprising the sulfur-carbon composite has the advantage of being able to implement a high capacity even at high loading.

However, as described above, in the case of a lithium-sulfur battery, a continuous decrease in capacity appears due to the elution of lithium polysulfide, which is an intermediate reducing agent of sulfur, during the discharging process. In addition, if the loading amount of sulfur is high, there is a problem that the electrochemical reactivity is lowered as lithium ions are difficult to enter and exit due to the non-conductive sulfur compound.

To this end, the positive electrode active material of the present invention, as shown in FIG. 1, covers the surface of the above-described core part (11) with a shell part (13) comprising a polythiophene acetic acid-polyethylene glycol graft copolymer.

In particular, in the case of the positive electrode active material according to the present invention, since at least a part of the surface, preferably the whole surface, of the core part containing the sulfur compound is coated with a polymer having both electron conductivity and ion conductivity, it provides electrical conductivity to the sulfur compound included in the core part, enables the smooth movement of lithium ions, and thus improves the electrochemical reactivity of the sulfur compound in the positive electrode active material, as well as improves the overvoltage problem that occurs when the sulfur loading amount is high, and suppresses the elution of lithium polysulfide to realize a lithium-sulfur battery with excellent capacity characteristics.

In the present invention, the polythiophene acetic acid-polyethylene glycol graft copolymer contained in the shell part (13) may be a compound having a structure represented by the following Formula 1:

[Formula 1]

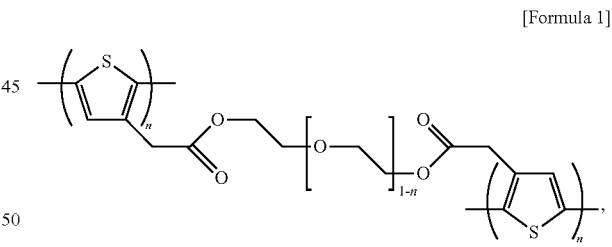

wherein n is each independently a rational number from 0 to 1.

The polythiophene acetic acid-polyethylene glycol graft copolymer of Formula 1 is a polymer having both electron conductivity and ion conductivity, which is produced by graft copolymerizing polythiophene acetic acid, which is an electron conductive polymer, with a polyethylene glycol-based polymer exhibiting ion conductivity.

Specifically, the polythiophene acetic acid-polyethylene glycol graft copolymer of Formula 1 consists of a main chain comprising a structure derived from polythiophene acetic acid and a side chain having a structure of polyethylene glycol.

As the main chain of the polythiophene acetic acid-polyethylene glycol graft copolymer of Formula 1 comprises a repeating unit derived from polythiophene acetic acid, it exhibits electron conductivity to facilitate electron transfer to the core part, thereby improving the reactivity of the positive electrode active material. In addition, the side chain of the polythiophene acetic acid-polyethylene glycol graft copolymer of Formula 1 comprises the structure of polyethylene glycol to improve the mobility of lithium ions and thus improve the electrochemical reactivity of the positive electrode active material, specifically, the sulfur compound contained in the core part (11), as well as adsorb lithium polysulfide and thus prevent the sulfur compound from leaving the electrochemical reaction region of the positive electrode, and suppress the diffusion movement of lithium polysulfide to the negative electrode and solve the problem of capacity loss caused by conventional lithium polysulfide, and thus further improve the capacity characteristics of the battery. In addition, in the case of the conventional polymer used for the coating of sulfur-carbon composite, as the loading amount of sulfur is increased, the coating amount and the distance from the current collector were increased, resulting in severe overvoltage. However, the polythiophene acetic acid-polyethylene glycol graft copolymer of Formula 1 according to the present invention does not generate an overvoltage due to an increase in the coating amount even when the loading amount of sulfur is increased, and it stably maintains its original function, so that the lithium-sulfur battery can exhibit excellent capacity characteristics.

In particular, as shown in FIG. 2, as the polythiophene acetic acid-polyethylene glycol graft copolymer of Formula 1 has a branched form in which a branched side chain (thin line in FIG. 2) is connected to the side of the main chain (bold line in FIG. 2), polythiophene acetic acid polymers can form a structure crosslinked with each other by polyethylene glycol. Unlike the conventional block, random or alternating copolymer of electron conductive polymer and ion conductive polymer, which has a linear shape and cannot form a crosslinked structure, the polythiophene acetic acid-polyethylene glycol graft copolymer of Formula 1 presented in the present invention can fully exhibit electron conductivity and ion conductivity due to the unique cross-linked structure formed by the branched polymer chain, and accordingly, exhibit the effect of suppressing the elution of lithium polysulfide.

The polythiophene acetic acid-polyethylene glycol graft copolymer represented by Formula 1 may have a weight-average molecular weight ($M_w$) of 10000 to 30000, preferably 15000 to 25000. If the weight-average molecular weight of the polythiophene acetic acid-polyethylene glycol graft copolymer is less than the above range, the crosslinking rate is lowered or a uniform coating is not achieved on the core part. On the contrary, if the weight-average molecular weight exceeds the above range, there is a problem that the solubility in the solvent is lowered.

The polythiophene acetic acid-polyethylene glycol graft copolymer contained in the shell part may be contained in an amount of 0.5 to 15 parts by weight based on 100 parts by weight of the total of the core part. The content of the polythiophene acetic acid-polyethylene glycol graft copolymer may be 0.5 parts by weight or more or 1 part by weight or more as a lower limit based on 100 parts by weight of the total of the core part, and may be 15 parts by weight or less, 10 parts by weight or less, or 5 parts by weight or less as an upper limit based on 100 parts by weight of the total of the core part. The content of the polythiophene acetic acid-polyethylene glycol graft copolymer contained in the shell part may be set by a combination of the lower limit and the upper limit described above. If the content is less than the above range, the above-described effects may be insignificant. On the contrary, if the content exceeds the above range, there is a problem that the energy density of the battery is lowered.

In addition, the polythiophene acetic acid-polyethylene glycol graft copolymer may be contained in an amount of 0.2 to 5% by weight based on 100% by weight of the total of the positive electrode active material for the lithium-sulfur battery. The content of the polythiophene acetic acid-polyethylene glycol graft copolymer may be 0.25% by weight or more or 0.35% by weight or more as a lower limit, and may be 4.5% by weight or less or 3.5% by weight or less as an upper limit, based on 100% by weight of the total of the positive electrode active material for the lithium-sulfur battery. The content of the polythiophene acetic acid-polyethylene glycol graft copolymer contained in the shell part may be set by a combination of the lower limit and the upper limit described above.

In the positive electrode active material for the lithium-sulfur battery according to an embodiment of the present invention, the thickness of the shell part is not particularly limited, but may be preferably 1 to 100 nm. If the thickness of the shell part is thinner than the above range, the improvement of the reactivity of the positive electrode active material and the effect of suppressing lithium polysulfide may be insignificant. On the contrary, if the thickness is thicker than the above-mentioned range, the resistance may increase during charging and discharging and the performance may be deteriorated.

In addition, the present invention provides a method of preparing the positive electrode active material for the lithium-sulfur battery.

As an example, the positive electrode active material for the lithium-sulfur battery is prepared through the steps of (a) preparing a core part comprising a sulfur compound, and (b) mixing the core part with a solution containing polythiophene acetic acid and polyethylene glycol-based polymer, and then heat-treating it to form a shell part comprising a polythiophene acetic acid-polyethylene glycol graft copolymer on the whole surface or a part of the surface of the core part.

First, in step (a), a core part containing a sulfur compound may be prepared.

The core part containing the sulfur compound is as described above.

As described above, the sulfur compound contained in the core part may be a sulfur-carbon composite.

In the present invention, the preparation method of the sulfur-carbon composite is not particularly limited in the present invention, and a method commonly used in the art may be used. As an example, a method of simply mixing the sulfur compound and the porous carbon material and then heat-treating it to complex them may be used.

Thereafter, the method for preparing the positive electrode active material for the lithium-sulfur battery of the present invention comprises the step of (b) mixing the core part with a solution containing polythiophene acetic acid and polyethylene glycol-based polymer, and then heat-treating it to form a shell part comprising a polythiophene acetic acid-polyethylene glycol graft copolymer on at least one surface of the core part.

In step (b), in order to coat the polythiophene acetic acid-polyethylene glycol graft copolymer on the core part prepared in step (a), a solution obtained by dissolving polythiophene acetic acid and polyethylene glycol-based polymer in a solvent is prepared.

The polythiophene acetic acid may be purchased commercially or may be prepared directly by a known method.

As an example, the polythiophene acetic acid may be prepared through the steps of (b-1) forming methyl thiopheneacetate by adding methanol and sulfuric acid to thiophene acetic acid; (b-2) forming poly(methyl thiopheneacetate) by adding iron chloride to the methyl thiopheneacetate; (b-3) forming polythiophene sodium acetate by adding sodium hydroxide to the poly(methyl thiopheneacetate); and (b-4) forming polythiophene acetic acid by adding hydrogen chloride to the polythiophene sodium acetate).

The polyethylene glycol-based polymer may comprise at least one selected from the group consisting of polyethylene glycol, polyethylene glycol methylether, polyethylene glycol dimethylether, polyethylene glycol dodecylether, polyethylene glycol benzylether, polyethylene glycol dibenzylether and polyethylene glycol-4-nonylphenylether. Preferably, the polyethylene glycol-based polymer may be at least one selected from the group consisting of polyethylene glycol and polyethylene glycol methylether.

In addition, the polyethylene glycol-based polymer may have a number average molecular weight ($M_n$) of 400 to 4000, preferably 400 to 2000.

The solvent is not particularly limited as long as it can dissolve the above-described polythiophene acetic acid and polyethylene glycol-based polymer, and has high volatility. As an example, the solvent may be a mixed solvent of water and alcohol, or a mixture of one or more organic solvents. In that case, the alcohol may be a lower alcohol having 1 to 6 carbon atoms, preferably methanol, ethanol, propanol, isopropanol, or the like. Examples of the organic solvent may comprise polar solvents such as acetic acid, dimethyl formamide (DMF), N-methyl-2-pyrrolidone (NMP), dimethyl sulfoxide (DMSO), and dimethylacetamide (DMAc) and nonpolar solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride, methylene chloride, and tetrahydrofuran (THF). Preferably, the solvent may be at least one selected from the group consisting of dimethylformamide, dimethylsulfoxide and dimethylacetamide.

The content of the solvent may be contained at a level having a concentration sufficient to facilitate the applying, that is, the coating of the shell part on the surface of the core part, and the specific content varies depending on the coating method and apparatus.

By mixing the core part of step (a) with a solution containing the polythiophene acetic acid and polyethylene glycol-based polymer, and then heat-treating them, a shell part containing a polythiophene acetic acid-polyethylene glycol graft copolymer on the whole surface or a part of the core part is formed.

The heat treatment may be performed at a temperature of 80 to 120° C. for 12 to 48 hours.

In particular, in the case of the method for preparing the positive electrode active material for the lithium-sulfur battery according to the present invention, as the shell part is formed in situ by synthesizing a polythiophene acetic acid-polyethylene glycol graft copolymer through simple heating in a solution state and coating the core part, without the complicated process involved in the process of coating the existing positive electrode active material, the uniformity and physical properties of the final prepared shell part are excellent as well as there are beneficial advantages in terms of process efficiency and productivity.

Additionally, after step (b), a drying process for removing the solvent may be further performed. The drying process is performed at a temperature and a time sufficient to sufficiently remove the solvent. The conditions may vary depending on the type of the solvent, and therefore, it is not specifically mentioned in the present invention. For example, the drying process may be carried out in a vacuum oven at 30 to 200° C. Examples of the drying method may comprise a drying method by warm air, hot air, or low-humidity air, a vacuum drying method. The drying time is not particularly limited, but is usually in the range of 30 seconds to 24 hours.

In addition, the present invention provides a positive electrode for a lithium-sulfur battery comprising the positive electrode active material for the lithium-sulfur battery.

The positive electrode may comprise a positive electrode current collector and a positive electrode active material layer formed on one or both sides of the positive electrode current collector.

The positive electrode current collector supports the positive electrode active material and is not particularly limited as long as it has high conductivity without causing chemical change in the battery. For example, copper; stainless steel; aluminum, nickel; titanium; palladium; sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by forming fine irregularities on the surface thereof, and may be formed in various forms such as film, sheet, foil, mesh, net, porous body, foam, or nonwoven fabric.

The positive electrode active material layer may comprise a positive electrode active material, and optionally, an electrically conductive material, and a binder.

The positive electrode active material is as described above.

In the positive electrode for lithium-sulfur battery of the present invention, the positive electrode active material may be contained in an amount of 50 to 95% by weight based on 100% by weight of the total of the positive electrode active material layer constituting the positive electrode for the lithium-sulfur battery. The content of the positive electrode active material may be 70% by weight or more or 85% by weight or more as a lower limit, and may be 99% by weight or less or 90% by weight or less as an upper limit, based on 100% by weight of the total of the positive electrode active material layer. The content of the positive electrode active material may be set by a combination of the lower limit and the upper limit described above. If the content of the positive electrode active material is less than the above range, it is difficult to sufficiently exhibit the electrochemical reaction of the electrode. On the contrary, the content exceeds the above range, there is a problem that the content of the binder is relatively insufficient to deteriorate the physical properties of the electrode.

The electrically conductive material contained in the positive electrode active material layer is a material that acts as a path through which electrons move from the current collector to the positive electrode active material by electrically connecting the electrolyte and the positive electrode active material. The electrically conductive material can be used without limitation as long as it has electrical conductivity.

For example, as the electrically conductive material, carbon black such as Super-P, Denka black, acetylene black, Ketjen black, channel black, furnace black, lamp black or thermal black, carbon derivatives such as carbon nanotubes, graphene or fullerene; electrically conductive fibers such as carbon fiber or metal fiber; carbon fluoride; metal powders such as aluminum or nickel powder; or electrically conductive polymers such as polyaniline, polythiophene, polyacetylene, or polypyrrole may be used alone or in combination.

The content of the electrically conductive material may be 0.01 to 30% by weight based on a total weight of the positive electrode active material layer.

The binder maintains the positive electrode active material in the positive electrode current collector, and organically connects the positive electrode active materials to increase the bonding force between them, and the binder may be any binder known in the art.

For example, the binder may be at least one mixture or copolymer selected from the group consisting of fluororesin-based binders including polyvinylidene fluoride (PVdF) or polytetrafluoroethylene (PTFE); rubber-based binders including styrene-butadiene rubber (SBR), acrylonitrile-butadiene rubber, and styrene-isoprene rubber; cellulose-based binders including carboxymethylcellulose (CMC), starch, hydroxypropyl cellulose, and regenerated cellulose; polyalcohol-based binders; polyolefin-based binders including polyethylene and polypropylene; polyimide-based binders; polyester-based binders; and silane-based binders.

The content of the binder may be 0.5 to 30% by weight, based on a total weight of the positive electrode active material layer. If the content of the binder is less than 0.5% by weight, the physical properties of the positive electrode may be deteriorated, so that the active material and the electrically conductive material in the positive electrode may fall out. If the content of the binder exceeds 30% by weight, the ratio of the active material and the electrically conductive material in the positive electrode is relatively reduced, so that the capacity of the battery can be reduced.

The positive electrode may be prepared by a conventional method known in the art. For example, the positive electrode can be prepared by mixing and stirring a positive electrode active material and a solvent, and if necessary, a binder, an electrically conductive material, and additives such as fillers to prepare a slurry, then applying (coating) the slurry to a current collector of a metal material, compressing and drying it.

Specifically, first, the binder is dissolved in a solvent for preparing a slurry for the positive electrode, and then the electrically conductive material is dispersed. As a solvent for preparing the slurry for the positive electrode, it is preferable to use a solvent that can uniformly disperse the positive electrode active material, the binder, and the electrically conductive material, and evaporates easily, and representatively, acetonitrile, methanol, ethanol, tetrahydrofuran, water, isopropyl alcohol, and the like can be used. Next, the positive electrode active material, optionally together with an additive, is uniformly dispersed again in a solvent in which the electrically conductive material is dispersed, thereby preparing a slurry for the positive electrode. The amount of the solvent, the positive electrode active material, or optionally the additive contained in the slurry for the positive electrode does not have a particularly important meaning in the present application, and it is sufficient only if it has an appropriate viscosity to facilitate application of the slurry for the positive electrode. The slurry for the positive electrode prepared in this way is applied to the current collector, and dried to form a positive electrode. The slurry for the positive electrode may be applied to the current collector at an appropriate thickness depending on the viscosity of the slurry and the thickness of the positive electrode to be formed.

The coating can be performed by a method commonly known in the art, but can be performed, for example, by distributing a slurry for the positive electrode on one side of the positive electrode current collector and then uniformly dispersing the slurry using a doctor blade or the like. In addition, the coating can be performed by a method such as die casting, comma coating, screen printing and the like.

The drying is not particularly limited, but may be performed within one day in a vacuum oven at 50° C. to 200° C.

Additionally, after the drying, the density of the positive electrode active material layer in the positive electrode may be increased by pressing the current collector. Methods, such as a mold press and a roll press, are mentioned as a press method.

The porosity of the positive electrode, specifically the positive electrode active material layer manufactured by the above-described components and manufacturing method, may be 50 to 80%, preferably 60 to 75%. If the porosity of the positive electrode is less than 50%, the degree of filling of the slurry for the positive electrode comprising the positive electrode active material, the electrically conductive material, and the binder becomes too high, so that the electrolyte cannot be maintained sufficiently to exhibit ion conduction and/or electric conduction between positive electrode active materials, thereby resulting in deterioration of the output characteristics or cycle characteristics of the battery and resulting in a problem that the overvoltage of the battery and the reduction in discharging capacity become severe. On the contrary, if the porosity of the positive electrode exceeds 80% and has an excessively high porosity, there is a problem that the physical and electrical connection with the current collector is lowered, resulting in a decrease in adhesion and difficulty in reaction, and there is a problem that the energy density of the battery may be lowered because the electrolyte is filled in the increased porosity. Therefore, the porosity is properly adjusted within the above range.

The loading amount of sulfur in the positive electrode for the lithium-sulfur battery according to the present invention, that is, the mass of sulfur per unit area in the positive electrode active material layer in the positive electrode may be 2.0 mAh/cm$^2$ or more, preferably 3.0 to 6.0 mAh/cm$^2$. With such a high sulfur loading amount, the lithium-sulfur battery comprising the positive electrode according to the present invention may exhibit excellent discharging capacity and lifetime characteristics.

In addition, the present invention provides a lithium-sulfur battery comprising the positive electrode for the lithium-sulfur battery.

The lithium-sulfur battery comprises a positive electrode, a negative electrode, and an electrolyte interposed therebetween, wherein the positive electrode comprises the positive electrode for the lithium-sulfur battery according to the present invention.

The positive electrode is as described above.

The negative electrode may comprise a negative electrode current collector and a negative electrode active material layer applied to one or both surfaces of the negative electrode current collector. Also, the negative electrode may be a lithium metal plate.

The negative electrode current collector is for supporting the negative electrode active material layer, and is as described in the positive electrode current collector.

The negative electrode active material layer may comprise an electrically conductive material, a binder, etc. in addition to the negative electrode active material. At this time, the electrically conductive material and the binder are as described above.

The negative electrode active material may comprise a material capable of reversibly intercalating or de-intercalating lithium ($Li^+$), a material capable of reacting with lithium ion to reversibly form lithium containing compounds, lithium metal, or lithium alloy.

The material capable of reversibly intercalating or de-intercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or a lithium metal powder.

The method of forming the negative electrode active material is not particularly limited, and a method of forming a layer or film commonly used in the art may be used. For example, methods such as compression, coating, and deposition may be used. In addition, a case, in which a thin film of metallic lithium is formed on a metal plate by initial charging after assembling a battery without a lithium thin film in the current collector, is also comprised in the negative electrode of the present invention.

The electrolyte contains lithium ions and is for causing an electrochemical oxidation or reduction reaction in the positive electrode and the negative electrode through them, and is as described above.

The electrolyte may be a non-aqueous electrolyte solution or a solid electrolyte that does not react with lithium metal, but is preferably a non-aqueous electrolyte, and comprises an electrolyte salt and an organic solvent.

The electrolytic salt which is comprised in the non-aqueous electrolyte solution is lithium salt. The lithium salt can be used without limitation as long as it is commonly used in an electrolyte solution for a lithium secondary battery. For example, the lithium salt may be $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylate, lithium tetraphenyl borate, lithium imide, etc.

The concentration of the lithium salt may be appropriately determined in consideration of ion conductivity, solubility and the like, and may be, for example, 0.1 to 4.0 M, preferably 0.5 to 2.0 M. If the concentration of the lithium salt is less than the above range, it is difficult to ensure ion conductivity suitable for operating the battery. On the other hand, if the concentration exceeds the above range, the viscosity of the electrolyte solution is increased to lower the mobility of the lithium ion and the decomposition reaction of the lithium salt itself may increase to deteriorate the performance of the battery. Therefore, the concentration is adjusted appropriately within the above range.

As the organic solvent contained in the non-aqueous electrolyte solution, those conventionally used in an electrolyte solution for a lithium secondary battery may be used without limitation, and for example, ether, ester, amide, linear carbonate, cyclic carbonate, etc. may be used alone or in combination of two or more thereof.

The ether-based compound may comprise acyclic ethers and cyclic ethers.

For example, the acyclic ether may be, but is not limited to, at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethylether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, and polyethylene glycol methylethyl ether.

As an example, the cyclic ether may be, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, and isosorbide dimethyl ether.

Examples of the ester of the organic solvent may be, but is not limited to, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, and a mixture of two or more thereof.

Specific examples of the linear carbonate compound may representatively be, but is not limited to, any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In addition, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. Examples of such halides comprise, but are not limited to, fluoroethylene carbonate (FEC) and the like.

The electrolyte may further include a nitric acid or nitrous acid-based compound as an additive in addition to the electrolyte salt and the organic solvent described above. The nitric acid or nitrous acid-based compound has an effect of forming a stable film on a lithium metal electrode, which is a negative electrode, and improving charging/discharging efficiency.

The nitric acid or nitrous acid-based compound is not particularly limited in the present invention, but may be at least one selected from the group consisting of inorganic nitric acid or nitrous acid-based compounds such as lithium nitrate ($LiNO_3$), potassium nitrate ($KNO_3$), cesium nitrate ($CsNO_3$), barium nitrate ($Ba(NO_3)_2$), ammonium nitrate (NH$_4$NO$_3$), lithium nitrite (LiNO$_2$), potassium nitrite (KNO$_2$), cesium nitrite (CsNO$_2$) and ammonium nitrite (NH$_4$NO$_2$); organic nitric acid or nitrous acid-based compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, dinitrotoluene, and combinations thereof, and preferably, lithium nitrate is used.

The injection of the electrolyte may be performed at an appropriate stage of the manufacturing processes of the electrochemical device, depending on the manufacturing process and required properties of the final product. That is, the injection can be performed before assembling the electrochemical device or at the final stage of assembling the electrochemical device.

A separator may be additionally comprised between the positive electrode and the negative electrode.

The separator may be made of a porous non-conductive or insulating material that separates or insulates the positive electrode and the negative electrode from each other and enables transport of lithium ions between the positive electrode and the negative electrode. The separator may be used without special limitation as long as it is used as a separator in a conventional lithium secondary battery. The separator may be an independent member such as a film, or may comprise a coating layer added to the positive and/or negative electrodes.

It is preferable that the separator has excellent wettability to the electrolyte while having low resistance to ion migration of the electrolyte.

The separator may be made of a porous substrate, and the porous substrate may be used as long as it is a porous substrate commonly used for a lithium-sulfur battery, and porous polymer films may be used alone or by laminating them, and for example, a nonwoven fabric or a polyolefin-based porous membrane made of glass fibers, polyethylene terephthalate fibers, etc. having a high melting point may be used, but is not limited thereto.

The material of the porous substrate is not particularly limited in the present invention, and any material can be used as long as it is a porous substrate commonly used in an electrochemical device. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole), and polyarylate.

The thickness of the porous substrate is not particularly limited, but may be 1 to 100 μm, preferably 5 to 50 μm. Although the thickness range of the porous substrate is not particularly limited to the above-mentioned range, if the thickness is excessively thinner than the lower limit described above, mechanical properties are deteriorated and thus the separator may be easily damaged during use of the battery.

The average diameter and porosity of the pores present in the porous substrate are also not particularly limited, but may be 0.001 μm to 50 μm and 10 to 95%, respectively.

The lithium secondary battery according to the present invention can be manufactured by lamination, stacking, and folding processes of the separator and the electrodes, in addition to the usual winding process.

The shape of the lithium secondary battery is not particularly limited, and may be various shapes such as a cylindrical shape, a laminate shape, and a coin shape.

Also, the present invention provides a battery module comprising the lithium secondary battery described above as a unit battery.

The battery module may be used as a power source for medium to large-sized devices requiring high temperature stability, long cycle characteristics, high capacity characteristics, and the like.

Examples of such medium to large-sized devices may comprise, but are not limited to, a power tool powered and moved by an electric motor; an electric car including an electric vehicle (EV), a hybrid electric vehicle (HEV), a plug-in hybrid electric vehicle (PHEV), and the like; an electric two-wheeled vehicle including an electric bike (E-bike) and an electric scooter (E-scooter); an electric golf cart; a power storage system, etc.

Hereinafter, preferred examples of the present invention will be described in order to facilitate understanding of the present invention. It will be apparent to those skilled in the art, however, that the following examples are only illustrative of the present invention and various changes and modifications can be made within the scope and spirit of the present invention, and that such variations and modifications are within the scope of the appended claims.

PREPARATION EXAMPLE

Preparation Example 1

Preparation of Polythiophene Acetic Acid

To a two-necked round-bottom flask, 10 g of 3-thiophene acetic acid, 50 ml of distilled methanol, and 0.1 ml of sulfuric acid were added, and stirred at 80° C. for 24 hours, and then methanol was removed under vacuum, and the resultant was dissolved in diethyl ether and extracted three times with distilled water. Magnesium sulfate was added to the diethylether layer to remove moisture and filtered to prepare liquid methyl thiophene acetate.

After dissolving 2 ml of methyl thiophene acetate in 5 ml of chloroform, 8.7 g of iron chloride (FeCl$_3$) was added, and the resultant was dissolved in 48 ml of chloroform, and stirred at 0° C. for 24 hours to prepare poly(methyl thiophene acetate).

The methyl thiophene acetate was added to an aqueous solution of 2 M sodium hydroxide and stirred at 100° C. for 24 hours to obtain polythiophene sodium acetate).

1 M hydrogen chloride was added to the polythiophene sodium acetate, stirred for 24 hours, and then vacuum dried to prepare polythiophene acetic acid.

Preparation Example 2

Preparation of Polythiophene Acetic Acid-Polyethylene Glycol Graft Copolymer

After dissolving 0.5 g of polythiophene acetic acid of Preparation Example 1 in 45 ml of dimethylformamide as a solvent, 2.8 g of polyethylene glycol (M$_n$=400) was added to prepare a mixed solution. At this time, the obtained reactant was precipitated in water to obtain a pure polythiophene acetic acid-polyethylene glycol graft copolymer ($M_w$=20000), and n was 0.7 based on Formula 1 of the present invention.

EXAMPLE AND COMPARATIVE EXAMPLE

Example 1

Sulfur and carbon black (Super-P) were mixed using a ball mill in a weight ratio of 7:3, and then heat-treated at a temperature of 155° C. for 35 minutes to prepare a sulfur-carbon composite.

After dissolving 0.02 g of the mixed solution (based on substances excluding solvent) containing 0.5 g of polythiophene acetic acid prepared in Preparation Example 1 and 2.8 g of polyethylene glycol ($M_n$=400) in 4 ml of dimethylformamide, 2 g of sulfur-carbon composite (S/CNT=7:3 (weight ratio)) was added, stirred for 24 hours, and heat treated at 100° C. for 15 hours to prepare a positive electrode active material.

Example 2

Sulfur and carbon black (Super-P) were mixed using a ball mill in a weight ratio of 7:3, and then heat-treated at a temperature of 155° C. for 35 minutes to prepare a sulfur-carbon composite.

After dissolving 0.06 g of the mixed solution (based on substances excluding solvent) containing 0.5 g of polythiophene acetic acid prepared in Preparation Example 1 and 2.8 g of polyethylene glycol ($M_n$=400) in 4 ml of dimethylformamide, 2 g of sulfur-carbon composite was added, stirred for 24 hours, and heat treated at 100° C. for 15 hours to prepare a positive electrode active material.

Example 3

90% by weight of the positive electrode active material prepared in Example 1, 5% by weight of carbon black (Super-P) as an electrically conductive material, and 5% by weight of styrene butadiene rubber/carboxyl methyl cellulose (SBR/CMC=7:3 (weight ratio)) as a binder were mixed to prepare a slurry for the positive electrode.

The slurry for the positive electrode prepared above was applied to a thickness of 300 μm on an aluminum current collector having a thickness of 20 μm, dried at 50° C. for 24 hours, and compressed with a roll press device to prepare a positive electrode. At this time, the loading amount of the positive electrode active material was 4.0 mAh/cm², and the porosity of the positive electrode was 70%.

A lithium-sulfur battery was prepared by placing the prepared positive electrode and a lithium metal negative electrode having a thickness of 45 μm to face each other, and interposing a polyethylene separator having a porosity of 45% between them, and then injecting 100 μl of the electrolyte.

At this time, as the electrolyte, a mixed solution prepared by dissolving 1 M lithium bis(fluorosulfonyl)imide (LiFSI) and 3% by weight of lithium nitrate ($LiNO_3$) in an organic solvent comprising 1,3-dioxolane and dimethyl ether (DOL:DME=1:1 (volume ratio)) was used.

Example 4

A lithium-sulfur battery was prepared in the same manner as in Example 3 above, except that the same content of the positive electrode active material of Example 2 instead of the positive electrode active material of Example 1 was used.

Comparative Example 1

A lithium-sulfur battery was prepared in the same manner as in Example 3 above, except that the slurry for the positive electrode was prepared by mixing 80% by weight of sulfur as a positive electrode active material, 10% by weight of carbon black (Super-P) as an electrically conductive material, and 10% by weight of polyvinylidene fluoride as a binder.

Comparative Example 2

A lithium-sulfur battery was prepared in the same manner as in Example 3 above, except that a positive electrode active material having a shell part containing polythiophene acetic acid-polyethylene glycol copolymer ($M_w$=20000, n=0.7) in the form of a line represented by Formula 2 below on the surface of the sulfur-carbon composite, instead of the positive electrode active material in Example 1 was used.

Specifically, the positive electrode active material was prepared by adding 2 g of sulfur-carbon composite to a solution containing 3% by weight of polythiophene acetic acid-polyethylene glycol copolymer of Formula 2 in dimethylformamide, and stirring while heating for 24 hours.

[Formula 2]

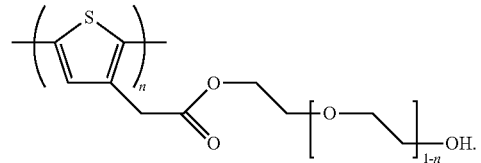

Experimental Example 1

Results of Thermogravimetric Analysis of Positive Electrode Active Material

TGA (thermogravimetric analysis, Mettler-Toledo, TGA2) analysis was performed on the positive electrode active material prepared in Example 1 and the polythiophene acetic acid-polyethylene glycol graft copolymer prepared in Preparation Example 2, and the results are shown in FIGS. 3 and 4.

As shown in FIGS. 3 and 4, since the same peak was observed in the result of TGA analysis, it can be seen that in the case of the positive electrode active material prepared in Example 1, the polythiophene acetic acid-polyethylene glycol graft copolymer was coated on the surface of the sulfur-carbon composite.

Experimental Example 2

Evaluation of Battery Performance

For the batteries manufactured in Examples 3 and 4 and Comparative Examples 1 and 2, the performance was evaluated using a charging/discharging measuring device (LAND CT-2001A, product from Wuhan company).

Specifically, after repeating discharging and charging 3 times at 25° C. at a current density of 0.1 C, and then performing discharging and charging at a current density of 0.2 C three times, the capacity and lifetime characteristics were measured while performing discharging at 0.5 C and charging at 0.3 C. The results obtained at this time are shown in FIGS. 5 and 6.

Through FIGS. 5 and 6, it can be seen that in the case of the batteries according to Examples, the overall performances are superior to those of Comparative Examples.

Specifically, through FIG. 5, it can be seen that Examples 3 and 4 comprising the positive electrode active material having the shell part according to the present invention have better overall performance of the battery compared to Comparative Example 1 using the conventional positive electrode active material which does not comprise the shell part. Also, in Examples 3 and 4, when the weight of the shell part is different, it can be seen that Example 4 not only has overall better capacity characteristics, but also has a small degree of capacity reduction compared to Example 3.

In addition, comparing the results of Example 3 and Comparative Example 2 in which the shapes of the polymers contained in the shell part are different, it can be seen that in the case of the battery of Example 3 containing a polymer containing a cross-linked structure, since linear polymers were contained, not only the capacity was higher, but also the capacity retention rate during the charging/discharging cycle was excellent, as compared to the battery of Comparative Example 2 that did not form a crosslinked structure.

From these results, it can be seen that in the case of the lithium-sulfur battery comprising the positive electrode active material according to the present invention, not only the reactivity of the positive electrode active material is improved, but also the capacity characteristics of the lithium-sulfur battery are excellent and the lifetime characteristics are also improved, as the elution of lithium polysulfide is suppressed.

DESCRIPTION OF SYMBOLS

10: Positive electrode active material for lithium-sulfur battery
11: Core part
13: Shell part

The invention claimed is:

1. A positive electrode active material, comprising:
a particulate structure having a core-shell structure,
wherein the particulate structure comprises a core part and a shell part covering the whole surface or a part of the surface of the core part, and
wherein the core part comprises a sulfur compound, and the shell part comprises a polythiophene acetic acid-polyethylene glycol graft copolymer.

2. The positive electrode active material according to claim 1, wherein the polythiophene acetic acid-polyethylene glycol graft copolymer has a structure in which polythiophene acetic acid polymers are crosslinked with each other by polyethylene glycol.

3. The positive electrode active material according to claim 1, wherein the polythiophene acetic acid-polyethylene glycol graft copolymer is a compound having a structure of the following Formula 1:

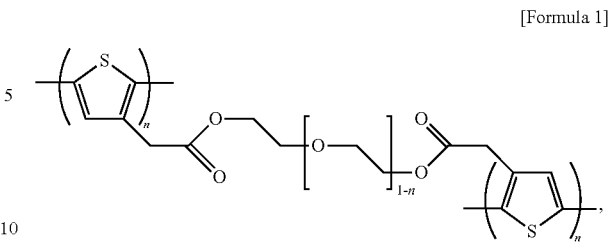

[Formula 1]

wherein n is each independently a rational number from 0 to 1.

4. The positive electrode active material according to claim 1, wherein the polythiophene acetic acid-polyethylene glycol graft copolymer has a weight-average molecular weight of 10000 to 30000.

5. The positive electrode active material according to claim 1, wherein the sulfur compound comprises at least one selected from the group consisting of inorganic sulfur, $Li_2S_n(n\geq 1)$, a disulfide compound, an organic sulfur compound, and a carbon-sulfur polymer $((C_2S_x)_n$, wherein x is 2.5 to 50 and $n\geq 2)$.

6. The positive electrode active material according to claim 1, wherein the sulfur compound in the core part is contained in the form of a sulfur-carbon composite.

7. The positive electrode active material according to claim 6, wherein the sulfur-carbon composite contains a porous carbon material and the sulfur compound which is contained in at least a portion of inner and outer surfaces of the porous carbon material.

8. The positive electrode active material according to claim 7, wherein the porous carbon material comprises at least one selected from the group consisting of graphite, graphene, carbon black, carbon nanotubes, carbon fibers, and activated carbon.

9. The positive electrode active material according to claim 1, wherein the polythiophene acetic acid-polyethylene glycol graft copolymer is contained in an amount of 0.5 to 15 parts by weight based on 100 parts by weight of the total of the core part.

10. The positive electrode active material according to claim 1, wherein the polythiophene acetic acid-polyethylene glycol graft copolymer is contained in an amount of 0.2 to 5% by weight based on 100% by weight of the total of the positive electrode active material for the lithium-sulfur battery.

11. A positive electrode comprising the positive electrode active material according to claim 1.

12. The positive electrode according to claim 11, wherein the positive electrode has a loading amount of sulfur of 2.0 $mAh/cm^2$ or more.

13. A lithium-sulfur battery, comprising:
the positive electrode according to claim 11;
a negative electrode; and
electrolyte.

14. A method for preparing a positive electrode active material, comprising the steps of:
(a) preparing a core part comprising a sulfur compound, and
(b) mixing the core part with a solution containing polythiophene acetic acid and polyethylene glycol-based polymer, and then heat-treating the solution mixed with the core part to form a shell part comprising a polythiophene acetic acid-polyethylene glycol graft copolymer on the whole surface or a part of the surface of the core part.

15. The method for preparing the positive electrode active material according to claim 14, wherein the polythiophene acetic acid-polyethylene glycol graft copolymer has a structure in which polythiophene acetic acid polymers are cross-linked with each other by polyethylene glycol.

16. The method for preparing the positive electrode active material according to claim 14, wherein the polyethylene glycol-based polymer comprises at least one selected from the group consisting of polyethylene glycol, polyethylene glycol methylether, polyethylene glycol dimethylether, polyethylene glycol dodecylether, polyethylene glycol benzylether, polyethylene glycol dibenzylether and polyethylene glycol-4-nonylphenylether.

17. The method for preparing the positive electrode active material according to claim 14, wherein the polyethylene glycol-based polymer has a number average molecular weight of 400 to 4000.

18. The method for preparing the positive electrode active material according to claim 14, wherein the heat-treating in step (b) is performed in a temperature range of 80 to 120° C.

* * * * *